US007000481B2

(12) United States Patent
Mo et al.

(10) Patent No.: US 7,000,481 B2
(45) Date of Patent: Feb. 21, 2006

(54) SYSTEM AND METHOD FOR AIR PRESSURE ELECTRIC SWITCH PRESSURE ADJUSTMENT

(75) Inventors: Patrick Mo, San Francico, CA (US); John Couvreur, Naperville, IL (US); Larry Miller, Montgomery, IL (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/957,932

(22) Filed: Oct. 4, 2004

(65) Prior Publication Data

US 2005/0126298 A1 Jun. 16, 2005

Related U.S. Application Data

(60) Provisional application No. 60/509,447, filed on Oct. 8, 2003.

(51) Int. Cl.
*G01L 13/02* (2006.01)

(52) U.S. Cl. ........................................................ 73/716

(58) Field of Classification Search .................. 73/706, 73/714, 715–728, 756; 200/83 L; 303/3
See application file for complete search history.

(56) References Cited

U.S. PATENT DOCUMENTS 3,989,911 A * 11/1976 Perry ........................ 200/83 L
4,198,356 A * 4/1980 Takimoto ................... 261/23.2

* cited by examiner

*Primary Examiner*—William Oen
(74) *Attorney, Agent, or Firm*—Alfred N. Goodman; Mark S. Bicks

(57) ABSTRACT

A system for air pressure electric switch adjustment comprises a frame. A pressure port is mounted to the frame for connection to a source of fluid under pressure to be monitored. An actuator is movably mounted relative to the frame responsive to fluid pressure at the pressure port. A switch includes a fixed contact and a movable contact. The fixed contact is fixedly mounted relative to the frame. A differential mechanism comprising a pair of linked levers is hingedly mounted to the frame. One of the linked levers is driven by the actuator. The other lever carries the movable contact. A snap spring links the two levers so that the other lever is normally in a first position with the switch in a normal state. The other lever is toggled responsive to pivotal movement of the one lever by the snap spring to a second position with the switch in an actuated state. A switch adjustment mechanism is operatively mounted to the frame for varying the first position of the other lever relative to the one lever to vary actuation pressure.

20 Claims, 7 Drawing Sheets

SYSTEM AND METHOD FOR AIR PRESSURE ELECTRIC SWITCH PRESSURE ADJUSTMENT

CROSS-REFERENCE TO RELATED PATENT APPLICATIONS

This application claims priority to, and incorporates by reference herein in its entirety, now abandoned U.S. Provisional Patent Application Ser. No. 60/509,447, filed 8 Oct. 2003.

FIELD OF THE INVENTION

This invention relates to air pressure switches and, more particularly, to a system and method for air pressure electric switch pressure adjustment.

BACKGROUND OF THE INVENTION

A mechanically actuated air pressure electric switch is commonly used in commercial and consumer grade electrically powered air compressor applications to monitor and to maintain air tank pressure levels within a pressure band. When tank air pressure is below a predetermined minimum pressure, an electrical contact in the pressure switch is closed in a “cut-in” position to complete an electrical circuit supplying power to an electrical motor that operates a mechanical air compressor connected to the air tank. When tank air pressure reaches a predetermined maximum pressure, the electrical contact within the pressure switch is opened in a “cut-out” position to break the electrical circuit supplying power to the electrical compressor motor. The compressor motor remains off until air tank pressure decreases to the cut-in pressure, when the switch closes the contact again turning the compressor on.

A conventional mechanical air pressure switch for such compressor applications, in one known form, transforms air pressure into switching logic using a pressurized flexible diaphragm that converts air pressure into a mechanical force. The mechanical force acts upon a contact controlling mechanism that toggles an electrical contact between open and closed positions. The pressure driven force input acting on the contact controlling mechanism effects translation within the mechanism of a triggering mechanical element from an initial, non-pressurized position. Translation of the triggering element continues as input air pressure increases until a pre-determined critical translation point at which the mechanism toggles the electrical contact rapidly from the cut-in closed circuit to the cut-out open circuit position. This minimizes electrical arcing during contact opening transition. When pressure driven force input to the contact mechanism decreases, motion of the triggering element reverses as the element moves towards its initial non-pressurized position. During the return travel of the triggering element, a second critical translation point is achieved at which the mechanism toggles the contact back to the cut-in closed position. As is apparent, the cut-in position corresponds to a cut-in pressure, while the cut-out position corresponds to a cut-out pressure. The pressure difference between the cut-out and cut-in pressures is referred to as the switch pressure differential. The contact controlling mechanism that toggles the switch contact is referred to as the switch differential mechanism. The actual cut-in and cut-out pressures are typically determined by use of a large helical compression spring that is pre-loaded to provide resisting force opposing the pressurized diaphragm force. Common manufacturing practice is to adjust the main spring pre-load to determine cut-out pressure. Adjustment of main spring pre-load is typically achieved by compressing the spring through use of a pusher plate and a long adjustment screw of approximately the same length as the main spring free length. The pusher plate is commonly implemented as a metal stamping. The main spring is usually wound from steel wire using standard mass production processes for helical compression springs. Force loads for such springs typically vary over a total tolerance range of about 20%. This variation in main spring load is relatively wide compared to the desired force response of the pressure switch. Calibration or adjustment of switch assemblies is required during manufacturing. The main spring load is adjusted to achieve the desired cut-out pressure. Process time required to pre-compress the main spring for the required pre-load can be significant, as several full rotations of the adjustment screw are often required to set the pre-load.

The present invention is directed to improvements in calibrating pressure switch cut-out pressure.

SUMMARY OF THE INVENTION

In accordance with the invention, there is disclosed a system and method for air pressure electric switch pressure adjustment.

Broadly, there is disclosed in accordance with one aspect of the invention, a system for air pressure electric switch adjustment comprising a frame. A pressure port is mounted to the frame for connection to a source of fluid under pressure to be monitored. An actuator is movably mounted relative to the frame responsive to fluid pressure at the pressure port. A switch includes a fixed contact and a movable contact. The fixed contact is fixedly mounted relative to the frame. A differential mechanism comprising a pair of linked levers is hingedly mounted to the frame. One of the linked levers is driven by the actuator. The other lever carries the movable contact. A snap spring links the two levers so that the other lever is normally in a first position with the switch in a normal state. The other lever is toggled responsive to pivotal movement of the one lever by the snap spring to a second position with the switch in an actuated state. A switch adjustment mechanism is operatively mounted to the frame for varying the first position of the other lever relative to the one lever to vary actuation pressure.

It is a feature of the invention that a switch housing is pivotally mounted to the frame and supports the fixed contact. The switch adjustment mechanism comprises the housing bearing on the other lever in the first position and the housing being adjustably positioned on the frame to vary the first position.

It is another feature of the invention to provide a set screw operatively fastening the housing to the frame for maintaining the housing in a select position.

It is another feature of the invention that the snap spring comprises a torsion spring.

It is a further feature of the invention that the switch adjustment mechanism varies the first position of the other lever to vary translation distance between the two levers proximate the snap spring to vary actuation pressure.

It is still another feature of the invention that the actuator comprises a diaphragm secured to the frame and an actuator dome engaging the one lever.

It is yet another feature of the invention that the switch adjustment mechanism comprises a mechanical stop element movably mounted to the frame bearing on the other lever in the first position.

There is disclosed in accordance with another aspect of the invention an adjustable air pressure electric switch comprising a frame. A pressure port is mounted to the frame for connection to a source of fluid under pressure to be monitored. An actuator is movably mounted relative to the frame responsive to fluid pressure at the pressure port. A switch includes a pair of fixed contacts fixedly mounted relative to the frame and a movable contact movable between a normal position in contact with the fixed contacts and an actuated position spaced from the fixed contacts. An actuating lever is pivotally mounted to the frame and driven by the actuator. A contact carrier lever is pivotally mounted to the frame at a contact carrier lever pivot and carries the movable contact. Means operatively link the actuating lever to the contact carrier lever so that the contact carrier lever is maintained in a cut-in position, with the movable contact in the normal position, or a cut-out position, with the movable contact in the actuated position. Translation between the cut-in and cut-out positions occurs when a total moment vector through the carrier contact lever pivot reverses in direction. A switch adjustment mechanism operatively mounted to the frame varies the cut-in position of the contact carrier lever to vary actuation pressure.

There is disclosed in accordance with another aspect of the invention a method for air pressure electric switch adjustment, comprising: providing a frame, a pressure port mounted to the frame for connection to a source of fluid under pressure to be monitored, an actuator moveably mounted relative to the frame responsive to fluid pressure at the pressure port and a switch including a fixed contact and a moveable contact, the fixed contact being fixedly mounted relative to the frame; providing a differential mechanism comprising a pair of linked levers hingedly mounted to the frame, one of the linked levers being driven by the actuator, the other lever carrying the moveable contact, and a snap spring linking the two levers so that the other lever is normally in first position with the switch in a normal state, and responsive to pivotal movement of the one lever, the other lever is toggled by the snap spring to a second position with the switch in an actuated state; and varying the first position of the other lever relative to the one lever with a switch adjustment mechanism on the frame to vary actuation pressure.

Further features and advantages of the invention will be readily apparent from the specification and from the drawings.

DETAILED DESCRIPTION OF THE INVENTION

Figure 1:
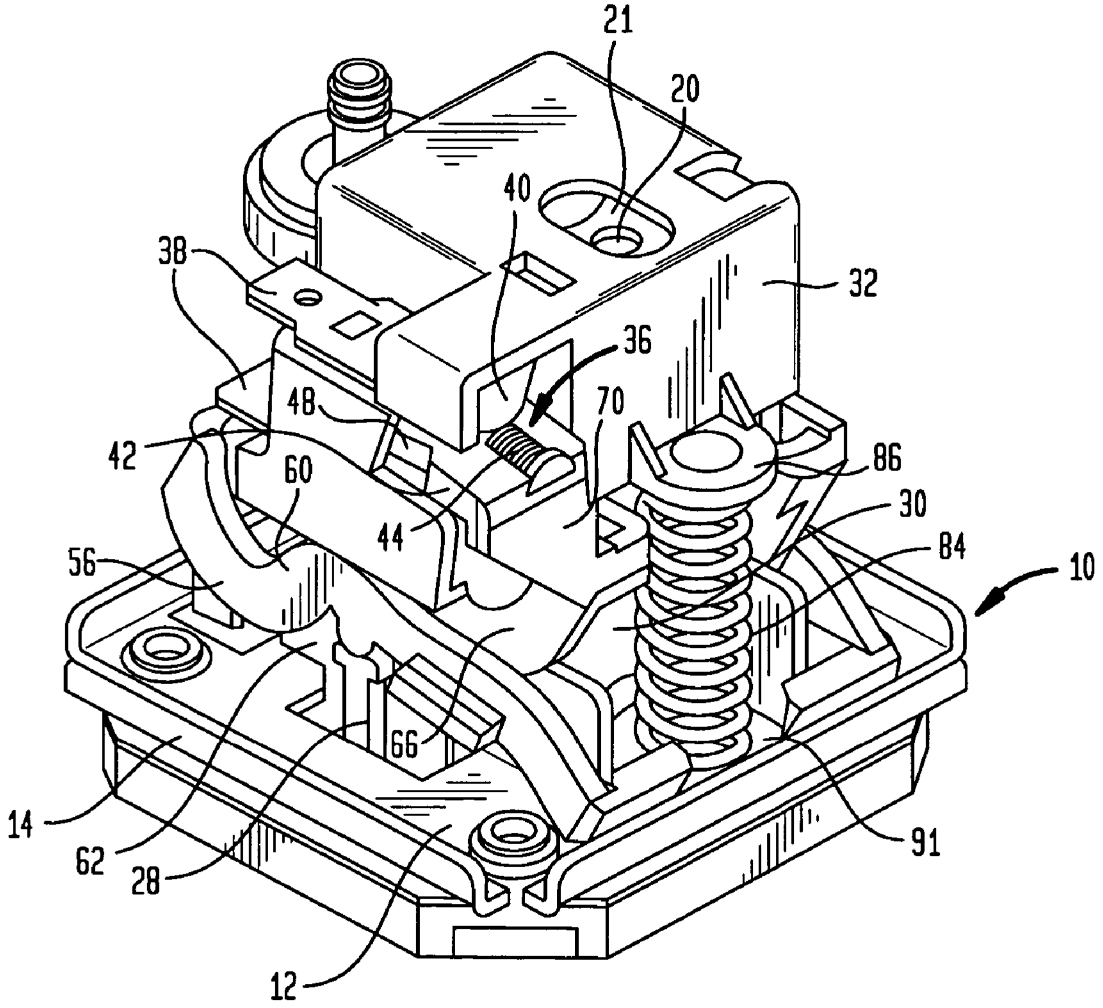
FIG. 1 is a first perspective view of an air pressure electric switch according to the invention.

An exemplary embodiment of a system and method for air pressure electric switch pressure adjustment is illustrated in the drawings. It is to be understood that the pressure switch of the present invention may be used in fluid handling systems where the fluid is either liquid or gaseous, even though, in the description, the pressure switch is frequently referred to as in the environment of an air compressor.

Figure 2:
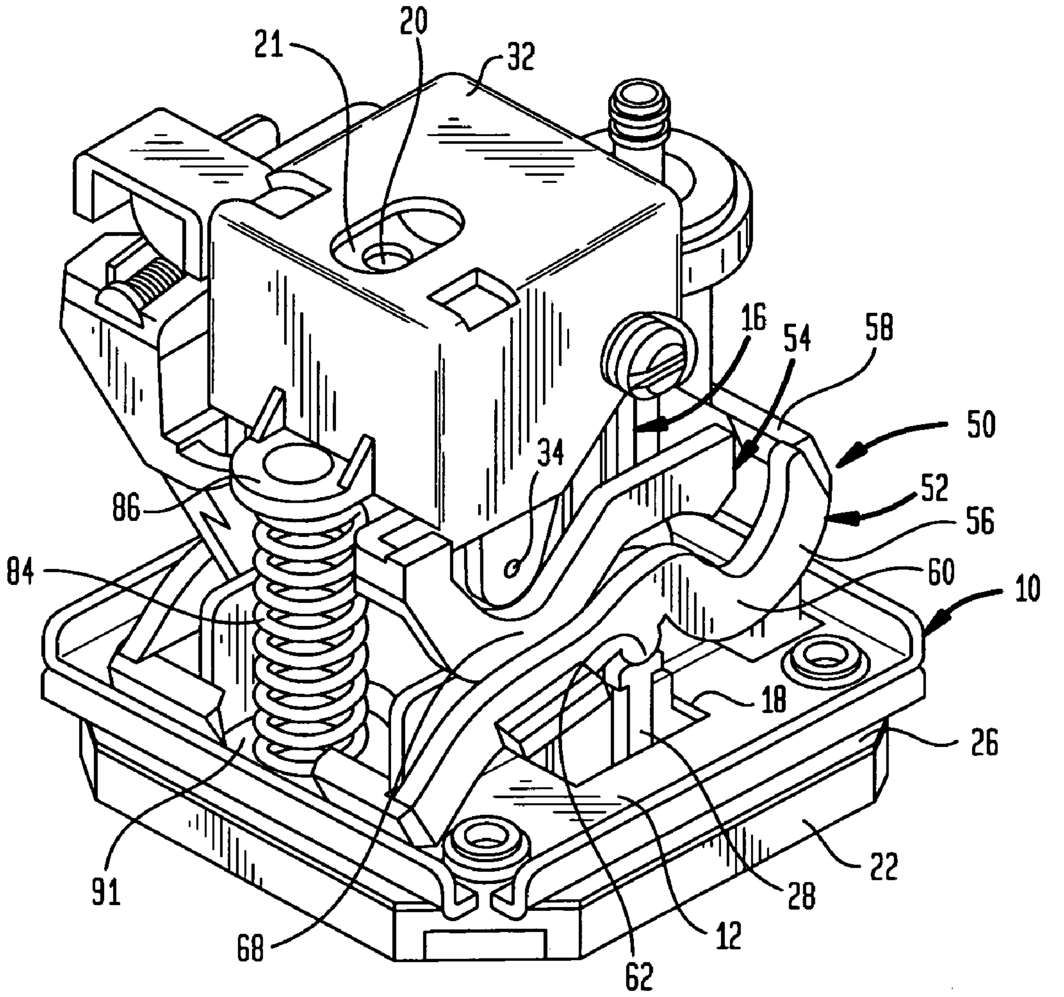
FIG. 2 is a second perspective view of the air pressure electric switch of FIG. 1.

Referring to FIGS. 1 and 2, the air pressure switch includes a frame 10. The frame 10 includes a bottom plate 12 having a peripheral upwardly turned side wall 14. A double walled frame bracket 16 extends upwardly from the bottom plate 12. A pair of openings 18 are provided through the plate 12 outwardly of each side of the bracket 16. A through opening 20 is provided at an upper bridge 21 of the bracket 16 for securing a cover (not shown).

Figure 4:
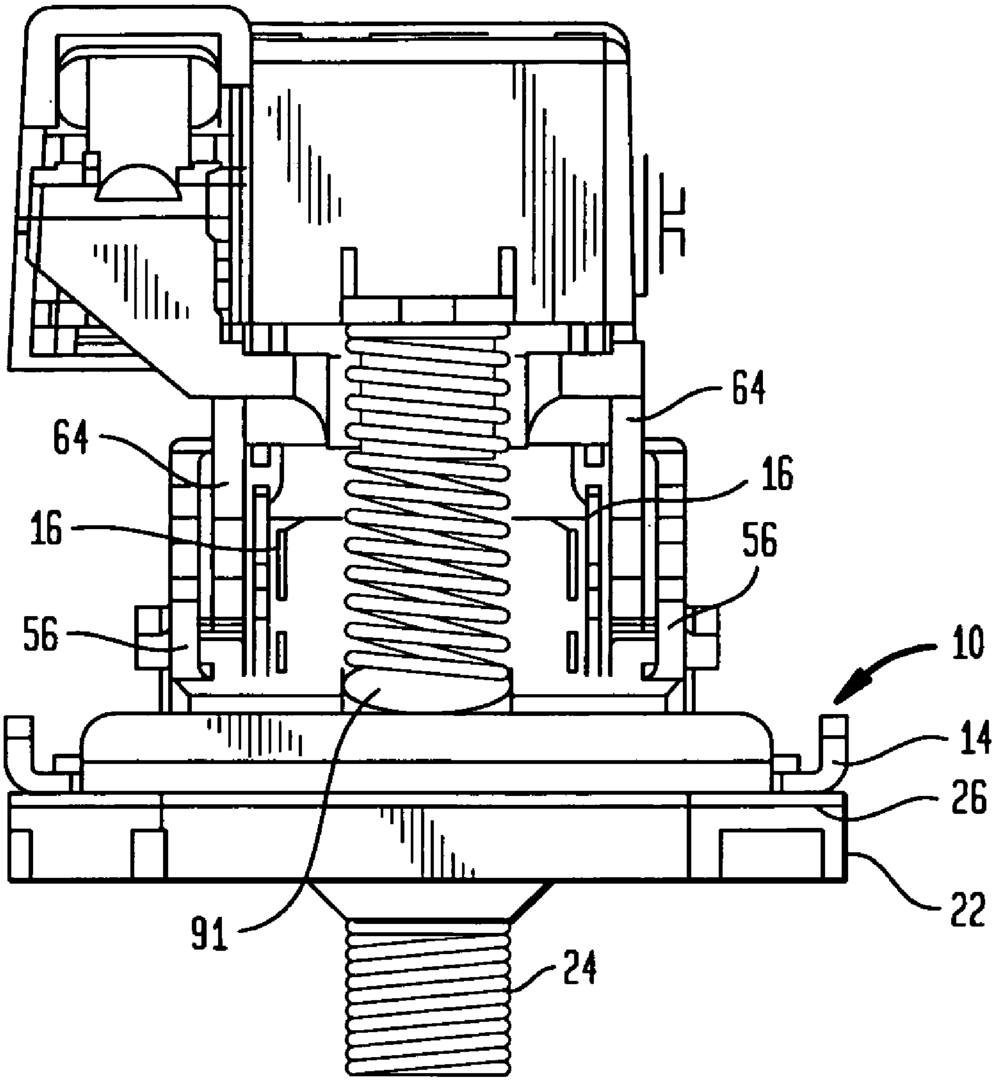
FIG. 4 is an end elevation view of the air pressure electric switch of FIG. 1.

A base 22 is mounted to the frame 10 and includes a pressure port 24, see FIG. 4. The pressure port 24 is adapted to be connected to a source of fluid under pressure to be monitored. A diaphragm 26 is sandwiched between the base 22 and the frame 10. A conventional pressure dome (not shown in detail) abuts the side of the diaphragm 26 opposite the port 24 and is movable responsive to pressure. The pressure dome may be as illustrated in U.S. Pat. No. 5,530,215, the specification of which is incorporated by reference herein. A pair of actuators 28 are integrally formed with the pressure dome and extend upwardly through the openings 18. A switch mechanism main spring 30 is under compression between the upper bridge 21 across the bracket 16 and the pressure dome. As such, the main spring 30 provides a pre-load pressure against the pressure dome and thus the actuators 28.

Figure 5:
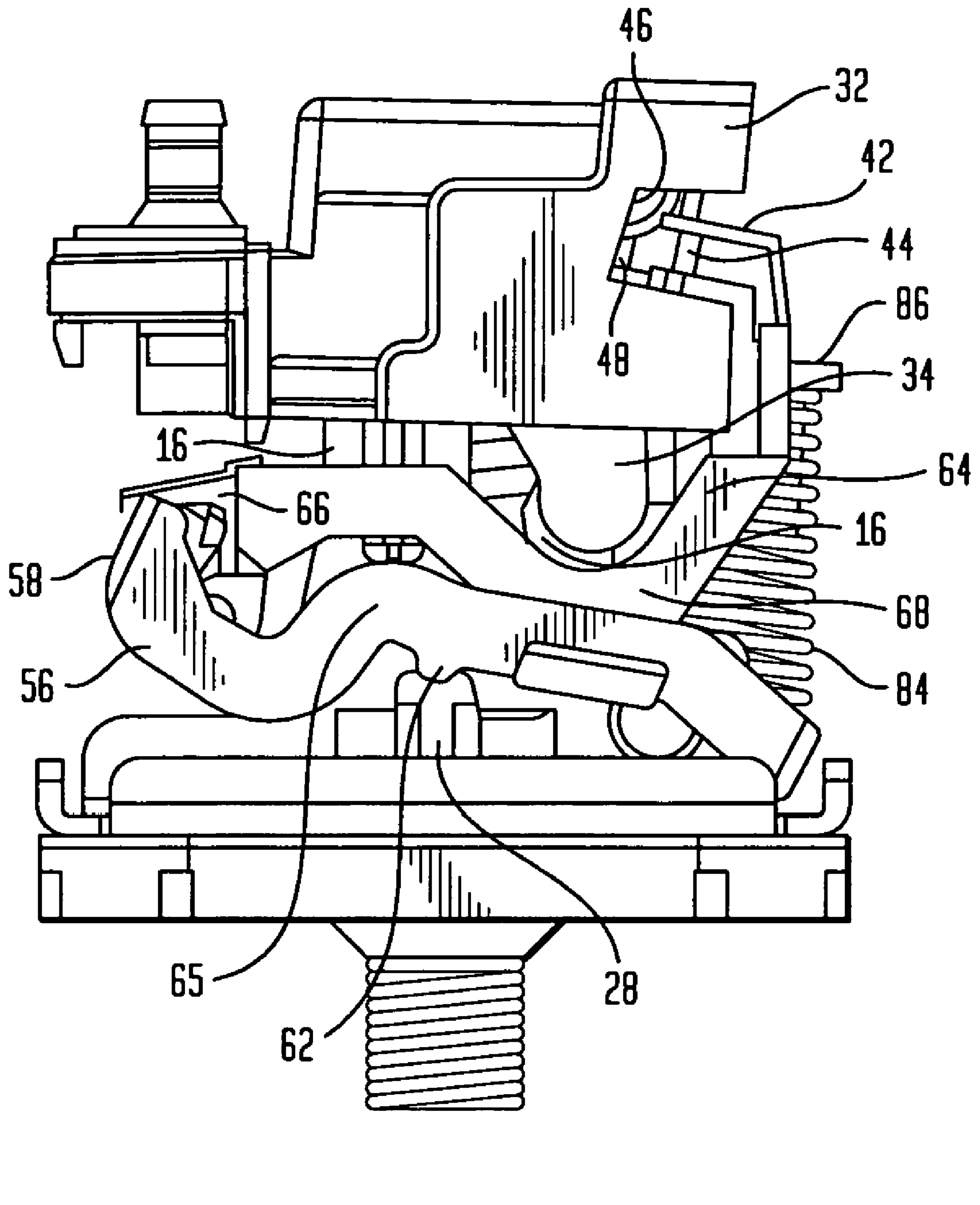
FIG. 5 is a side view of the air pressure electric switch of FIG. 1.
Figure 6:
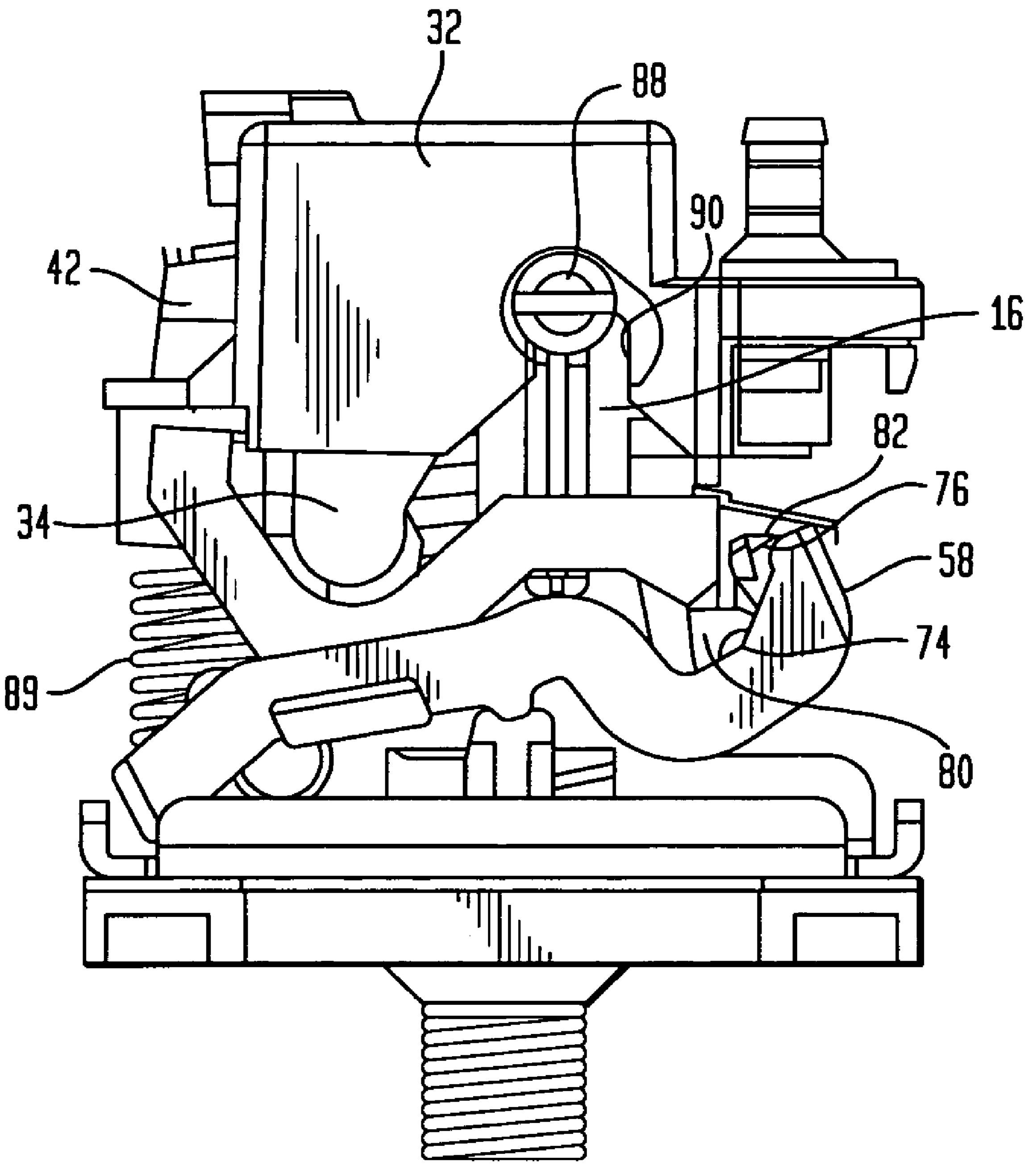
FIG. 6 is a second side view, opposite of that of FIG. 5, for the air pressure electric switch of FIG. 1.

The housing 32, also referred to as an arc box housing, is hingedly mounted to the bracket 16 at pivot connections 34, see FIGS. 5 and 6. The arc box housing 32 houses an electrical switch 36 including fixed contacts 38 and a movable contact 40. The fixed contacts 38 are fixedly mounted to the housing 32. The movable contact 40 is secured to a contact carrier 42 under the force of a compression contact spring 44. The contact carrier 42 is movable, as described below, to move the movable contact 40 between closed and open positions, as is conventional. Referring particularly to FIGS. 1 and 5, the housing 32 includes a notch/stop 46. The movable contact 40 is positioned to move in an area proximate the notch/stop 46 and the contact carrier 42 includes a stop 48 that abuts the notch/stop 46 to limit movement of the contact carrier 42 with the movable contact 40 in the normally closed position.

A differential mechanism 50 comprises an actuating lever 52 linked to a contact carrier lever 54. The actuating lever 52 is generally rectangle shaped and has opposite side legs 56 connected by a cross bar 58. The actuating lever legs 56 are pivotally mounted to the bracket 16 at pivot connections 60. A cam 62 extends downwardly from each leg 56 just rearwardly of the pivot connection 60. Each cam 62 bears on one of the dome actuators 28. As such, linear movement of the dome actuators 28 causes the actuating lever 52 to pivot about the pivot connection 60 so that the front cross bar 58 moves generally upwardly or downwardly, opposite movement of the actuators 28.

The contact carrier lever 54 is also generally rectangle shaped and includes opposite legs 64 connected to a front cross bar 66. The contact carrier lever legs 64 are pivotably connected to the frame bracket 16 at a pivot connection indicated at 68. The contact carrier 42 is connected to one of the legs 66 using a connecting beam 70, see FIG. 1. As is apparent, the connecting beam 70 may be integrally formed with the contact carrier lever 54 as well as the contact carrier 42.

Figure 3:
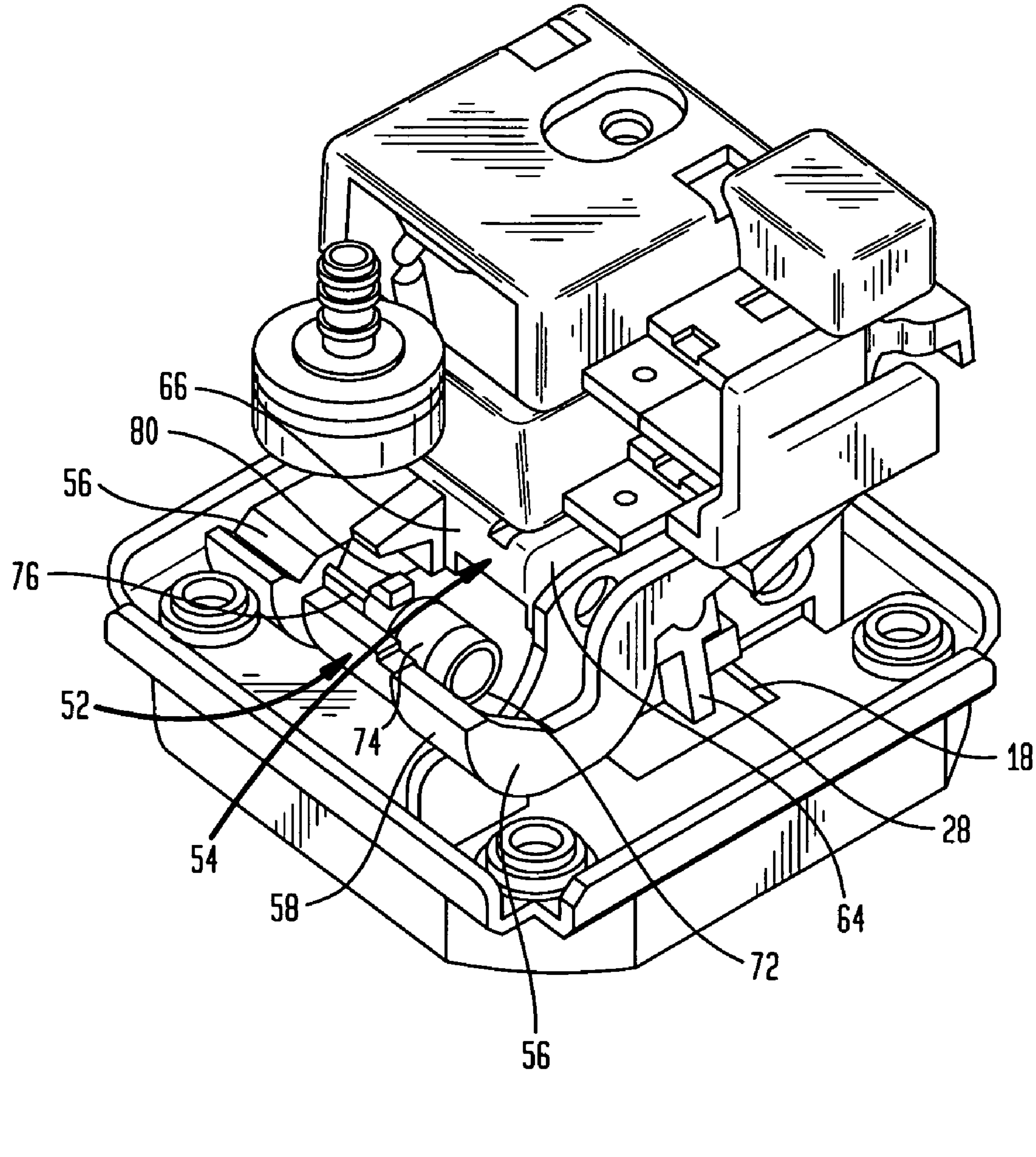
FIG. 3 is a third perspective view of the air pressure electric switch of FIG. 1.

The differential mechanism 50 further comprises a snap spring 72, see FIG. 3, linking the actuating lever 52 to the contact carrier lever 54. Particularly, the snap spring 72 comprises a torsion spring having legs 74 and 76. The first leg 74 is connected to the contact carrier lever front cross bar 66 at a torsion spring groove 80. The second leg 76 is connected proximate the actuating lever front cross bar 58 with a torsion spring groove 82.

A compression spring 84 extends between a cross bar 91 between the actuator lever legs 56 and an extension 86 on a rear of the housing 32. The spring 84 biases the actuator lever legs 56 in a clockwise direction when viewed in FIG. 5 relative to the pivot connection 60. A screw 88 extends through a generally oval notch 90 in the housing and is received in one wall of the bracket 16. The screw 88 maintains the housing 32 in a select position. The screw 88 can be loosened and the housing 32 moved about its pivot connection 34 to vary position of the housing. The position of the housing 32 determines position of the notch 46, see FIG. 1, and thus the limit position of the contact carrier 42 to provide pressure adjustment, as described below.

The differential mechanism 50 comprises the two linked levers 52 and 54 rotating in a single plane of motion. The actuating lever 52 acts as a triggering element that receives the force input from the pressurized diaphragm 26 represented by movement of the dome actuators 28. The contact carrier lever 54 is linked to the actuating lever 52 through the torsion or snap spring 72. Mechanical forces acting on the actuating lever 52 and the contact carrier lever 54 give rise to moment vectors through the respective pivots 60 and 68. These moment vectors change in magnitude and direction depending on the relative positions of the actuating lever 52 and contact carrier lever 54. The differential mechanism 50 is designed to maintain the contact carrier 42 in a bi-stable state, either in the cut-in position with the switch 36 closed or in the cut-out position with the switch 36 open. The differential mechanism cut-out and cut-in critical translation points occur when the total moment vector through the contact carrier lever pivot 68 reverses in direction. At these critical translation points, the contact carrier lever 54 is triggered and toggles its position through a snapping rotating motion due to the moment applied by the torsion spring 72. By changing the relative offset position of the contact carrier lever 54 in the non-pressurized switch condition or cut-in state, the cut-out critical translation point of the triggering actuating lever 52 can be shifted, hence shifting the corresponding cut-out pressure.

In use, as pressure at the pressure port 24 increases, the actuating lever cross bar 58 moves downward. At the critical translation point, the torsion spring 72 causes the contact carrier lever cross bar 66 to snap upwardly, rotating the contact carrier 42 away from the housing notch/stop 46 to actuate or open the switch 36 so the moveable contact 40 is spaced from the fixed contacts 38. Subsequently, as pressure at the pressure port 24 decreases, the actuating lever cross bar 58 moves upward. At the critical translation point, the torsion spring 72 causes the contact carrier lever cross bar 66 to snap downwardly, rotating the contact carrier 42 toward the housing notch/stop 46 until the carrier stop 48 rests against the housing notch/stop 46 to close the switch 36 so the moveable contact 40 is in electrical contact with the fixed contacts 38. As is apparent, switch contact operation could be opposite that described herein, or multiple contacts could be provided.

Offsetting of the position of the contact carrier lever 54 relative to the actuating lever 52 is achieved by rotating the cut-in position mechanical notch/stop 46, see FIGS. 1 and 5. The mechanical notch/stop 46 is provided on the arc box housing 32, as described. By rotating the arc box housing 32 relative to the switch differential mechanism 50, the cut-in position of the contact carrier lever 54 can be offset. Rotation of the arc box housing 32 to achieve desired cut-out pressure for the switch is performed during switch manufacture as a calibration procedure. Relatively fine offsetting of the contact carrier position should provide for the desired cut-out calibration range.

Figure 7:
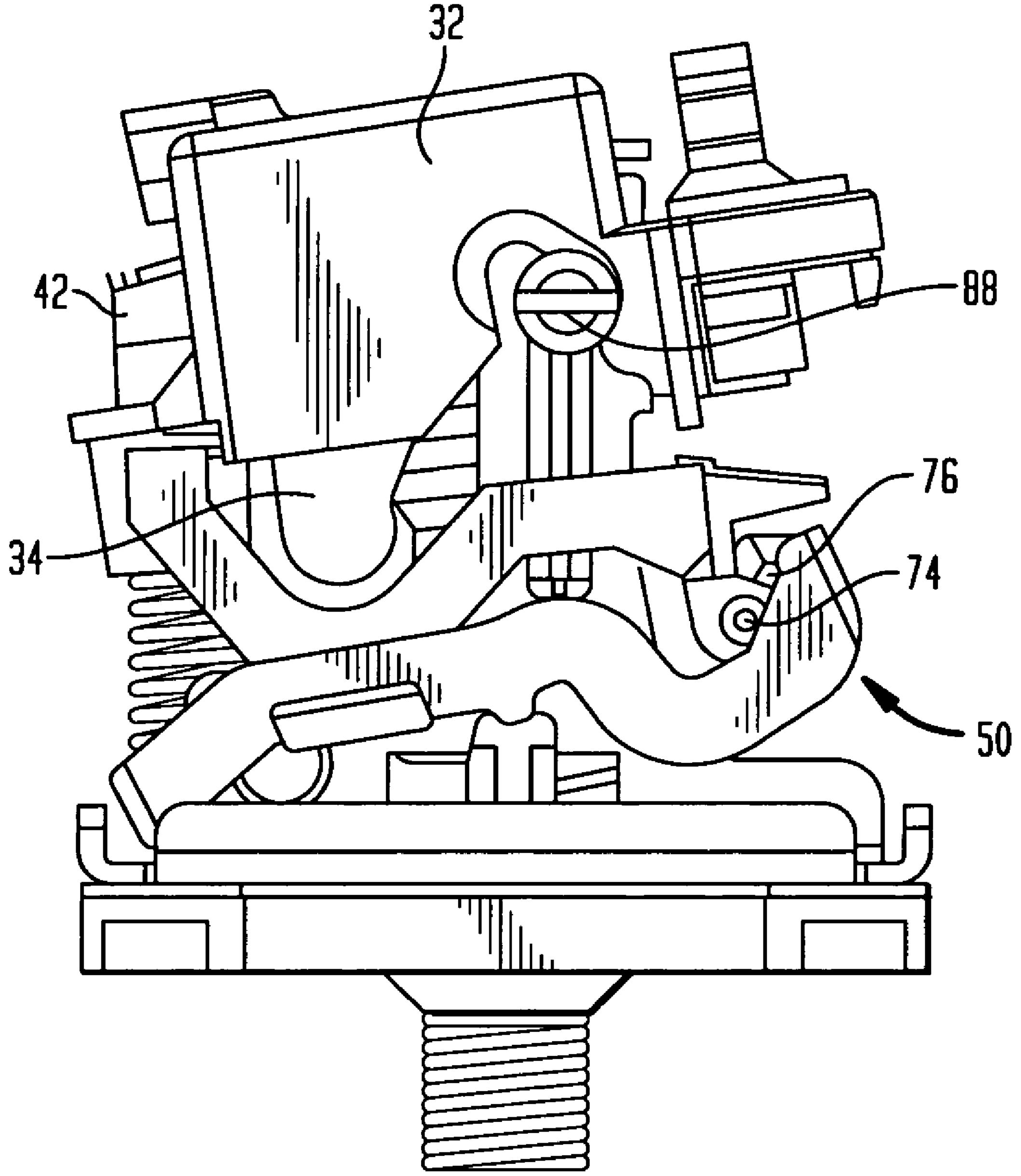
FIG. 7 is a side view, similar to that of FIG. 6, illustrating structure for adjusting pressure.

Particularly, and with reference to FIGS. 6 and 7, the screw 88 can be loosened and the arc box housing 32 rotated about the pivot connection 34. As is apparent in comparing FIG. 6 to FIG. 7, as the housing 32 is rotated from the position of FIG. 6 to the position of FIG. 7, the spacing between the torsion spring legs 74 and 76 becomes closer. Thus, the critical translation distance between the torsion spring grooves 80 and 82 in the respective contact carrier lever 54 and the actuating lever 52 is decreased with the described rotation of the arc box housing 32 and thus contact carrier 42. As is apparent, the arc box housing 32 can be rotated in the opposite direction, i.e., from that in FIG. 7 to that in FIG. 6, or to any intermediate position between limits defined by size of the notch 90, to adjust pressure.

The approach of the present invention for cut-out pressure adjustment permits elimination from the switch assembly of the stamped main spring pusher plate in prior devices and the long adjustment screw. Because switch cut-out pressure calibration is achieved within fraction of rotation of the arc box housing 32, calibration process time can be reduced.

Thus, as described, the torsion spring 72 operatively links the actuating lever 52 to the contact carrier lever 54 so that the contact carrier lever 54 is maintained in the cut-in position, with the movable contact 40 in the normal position, or a cut-out position, with the movable contact 40 in the actuated position, and translation between the cut-in and cut-out positions occurs when a total moment vector through the contact carrier lever pivot 68 reverses in direction. The arc box housing 32 operates as a switch adjustment mechanism operatively mounted to the frame bracket 16 for varying position of the cut-in position of the contact carrier lever 54 to vary actuation pressure.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render any claim seeking priority hereto invalid, then any such conflicting information in such incorporated by reference material is specifically not incorporated by reference herein.

We claim:

1. A system for air pressure electric switch adjustment, comprising:

a frame;

a pressure port mounted to the frame for connection to a source of fluid under pressure to be monitored;

an actuator moveably mounted relative to the frame responsive to fluid pressure at the pressure port;

a switch including a fixed contact and a moveable contact, the fixed contact being fixedly mounted relative to the frame;

a differential mechanism comprising a pair of linked levers hingedly mounted to the frame, one of the linked levers being driven by the actuator, the other lever carrying the moveable contact, and a snap spring linking the two levers so that the other lever is normally in a first position with the switch in a normal state, and responsive to pivotal movement of the one lever, the other lever is toggled by the snap spring to a second position with the switch in an actuated state; and a switch adjustment mechanism operatively mounted to the frame for varying the first position of the other lever relative to the one lever to vary actuation pressure.

2. The system for air pressure electric switch adjustment of claim 1 further comprising a switch housing pivotally mounted to the frame and supporting the fixed contact, wherein the switch adjustment mechanism comprises said housing bearing on the other lever in the first position and the housing being adjustably positioned on the frame to vary the first position.

3. The system for air pressure electric switch adjustment of claim 2 further comprising a set screw operatively fastening the housing to the frame for maintaining the housing in a select position.

4. The system for air pressure electric switch adjustment of claim 1 wherein the snap spring comprises a torsion spring.

5. The system for air pressure electric switch adjustment of claim 1 wherein the switch adjustment mechanism varies the first position of the other lever to vary translation distance between the two levers proximate the snap spring to vary actuation pressure.

6. The system for air pressure electric switch adjustment of claim 1 wherein the actuator comprises a diaphragm secured to the frame and an actuator dome engaging the one lever.

7. The system for air pressure electric switch adjustment of claim 1 wherein the switch adjustment mechanism comprises a mechanical stop element moveably mounted to the frame bearing on the other lever in the first position.

8. An adjustable air pressure electric switch comprising:

a frame;

a pressure port mounted to the frame for connection to a source of fluid under pressure to be monitored;

an actuator moveably mounted relative to the frame responsive to fluid pressure at the pressure port;

a switch including a pair of fixed contacts fixedly mounted relative to the frame and a moveable contact moveable between a normal position in contact with the fixed contacts and an actuated position spaced from the fixed contacts;

an actuating lever pivotally mounted to the frame and driven by the actuator;

a contact carrier lever pivotally mounted to the frame at a contact carrier lever pivot and carrying the moveable contact;

means for operatively linking the actuating lever to the contact carrier lever so that the contact carrier lever is maintained in a cut-in position, with the moveable contact in the normal position, or a cut-out position, with the moveable contact in the actuated position, and translation between the cut-in and cut-out positions occurs when a total moment vector through the carrier contact lever pivot reverses in direction; and a switch adjustment mechanism operatively mounted to the frame for varying the cut-in position of the contact carrier lever to vary actuation pressure.

9. The adjustable air pressure electric switch of claim 8 further comprising a switch housing pivotally mounted to the frame and supporting the fixed contacts, wherein the switch adjustment mechanism comprises said housing bearing on the contact carrier lever in the cut-in position and the housing being adjustably positioned on the frame to vary the cut-in position of the contact carrier lever.

10. The adjustable air pressure electric switch of claim 9 further comprising a set screw operatively fastening the housing to the frame for maintaining the housing in a select position.

11. The adjustable air pressure electric switch of claim 8 wherein the means for operatively linking the actuating lever to the contact carrier lever comprises a snap spring linking the two levers.

12. The adjustable air pressure electric switch of claim 11 wherein the snap spring comprises a torsion spring.

13. The adjustable air pressure electric switch of claim 11 wherein the switch adjustment mechanism varies the cut-in position of the contact carrier lever to vary translation distance between the two levers proximate the snap spring to vary actuation pressure.

14. The adjustable air pressure electric switch of claim 8 wherein the actuator comprises a diaphragm secured to the frame and an actuator dome engaging the actuating lever.

15. The adjustable air pressure electric switch of claim 8 wherein the switch adjustment mechanism comprises a mechanical stop element moveably mounted to the frame bearing on the contact carrier lever in the cut-in position.

16. A method for air pressure electric switch adjustment, comprising:

providing a frame, a pressure port mounted to the frame for connection to a source of fluid under pressure to be monitored, an actuator moveably mounted relative to the frame responsive to fluid pressure at the pressure port and a switch including a fixed contact and a moveable contact, the fixed contact being fixedly mounted relative to the frame;

providing a differential mechanism comprising a pair of linked levers hingedly mounted to the frame, one of the linked levers being driven by the actuator, the other lever carrying the moveable contact, and a snap spring linking the two levers so that the other lever is normally in first position with the switch in a normal state, and responsive to pivotal movement of the one lever, the other lever is toggled by the snap spring to a second position with the switch in an actuated state; and varying the first position of the other lever relative to the one lever with a switch adjustment mechanism on the frame to vary actuation pressure.

17. The method for air pressure electric switch adjustment of claim 16 further comprising providing a switch housing pivotally mounted to the frame and supporting the fixed contact, wherein the switch adjustment mechanism comprises said housing bearing on the other lever in the first position and the housing being adjustably positioned on the frame to vary the first position.

18. The method for air pressure electric switch adjustment of claim 17 further comprising providing a set screw operatively fastening the housing to the frame for maintaining the housing in a select position.

19. The method for air pressure electric switch adjustment of claim 16 wherein the switch adjustment mechanism varies the first position of the other lever to vary translation distance between the two levers proximate the snap spring to vary actuation pressure.

20. The method for air pressure electric switch adjustment of claim 16 wherein the switch adjustment mechanism comprises a mechanical stop element moveably mounted to the frame bearing on the other lever in the first position.

* * * * *